Aug. 13, 1957 S. H. FAIRWEATHER 2,802,952
LOAD DIVISION TRIM CONTROL
Filed Sept. 28, 1953
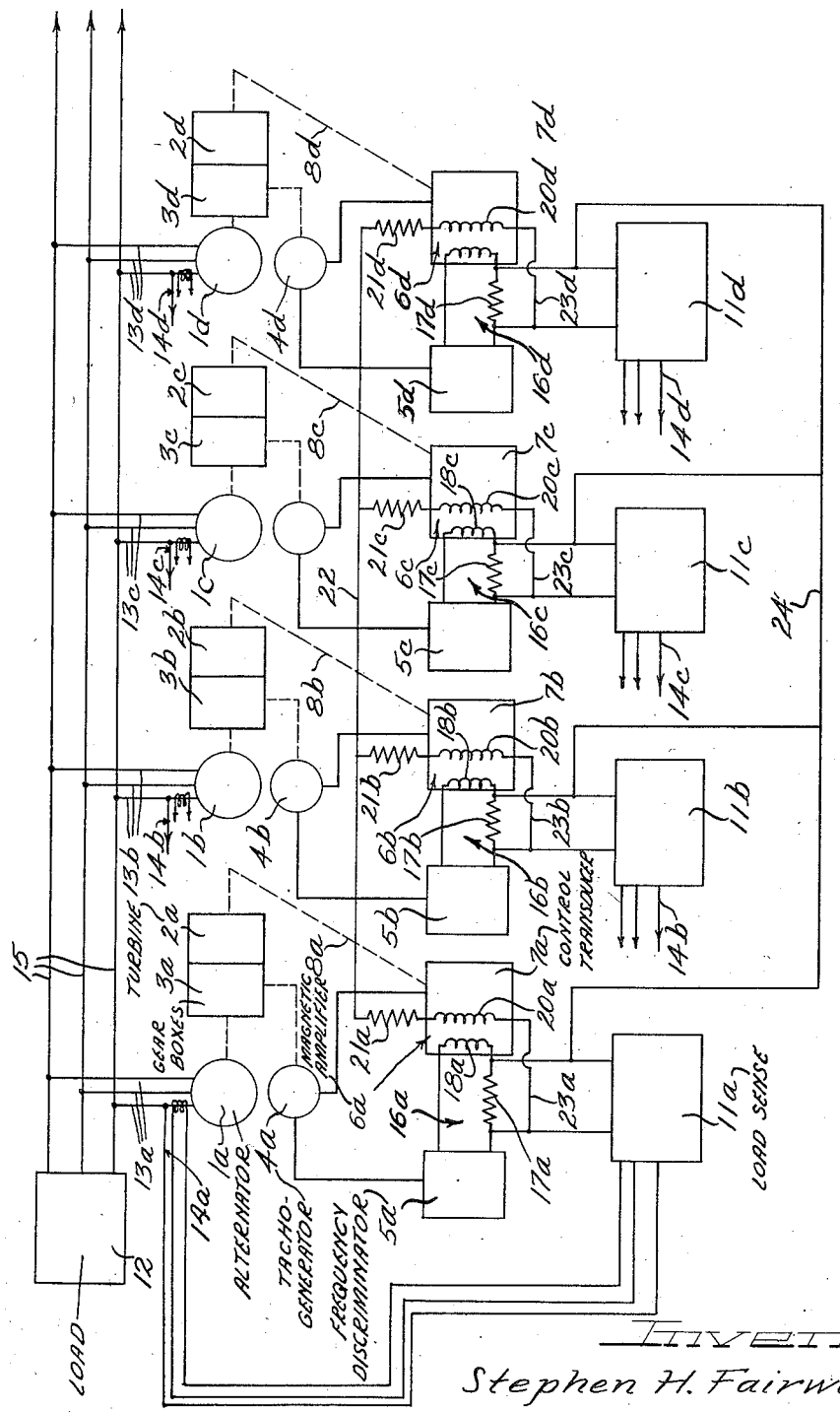
Inventor
Stephen H. Fairweather
By Hill, Sherman, Meroni, Gross & Simpson Attys United States Patent Office 2,802,952
Patented Aug. 13, 1957

2,802,952

LOAD DIVISION TRIM CONTROL

Stephen H. Fairweather, South Euclid, Ohio, assignor to Thompson Products, Inc., Cleveland, Ohio, a corporation of Ohio Application September 28, 1953, Serial No. 382,583

3 Claims. (Cl. 307—57)

The present invention relates to a load division control system having particularly advantageous utility in controlling paralleled alternators supplying electrical power to a common bus. More particularly, the present invention relates to a load division trim control system wherein load division between parallel alternators may be accurately coordinated and maintained with preselected limits of boundary about the average load.

The system of the present invention is closely related to the system of the invention described and claimed in copending application for Letters Patent by Walker R. Chapman and myself, jointly, Serial No. 382,582, filed September 28, 1953 now Patent Number 2,790,091 and entitled "Control System for Turbine Driven Alternators," of which joint application this is a continuation-in-part.

In the system described and claimed in the copending application of Walter R. Chapman and myself, of which application this is a continuation-in-part, there is provided alternator load control means readily adapted to vary the input drive power energy to an alternator driving turbine or the like whereby variations in the input power supply and variations in the load, individually or together, are corrected so that the electrical system may operate at a substantially constant output frequency irrespective of those load variations and input power energy variations. The preferred embodiment of the invention described in the identified copending application includes a frequency discriminator frequency error sensing means provided with an input signal generated at a tacho generator geared to the driven alternator and adapted to provide an output of the same frequency as the alternator output. The frequency error sensing means then provides an error sensing signal to a magnetic amplifier and torque motor and actuator mechanism comprising an electromechanical, and specifically an electropneumatic, transducer system for controlling the input energy to the pneumatic turbine driving the gear box which in turn drives the alternator. That system also includes a load sensing network operable to control the transducer in accordance with the real load on the alternator. An important feature of the invention described and claimed in the copending application identified is the transducer which is provided with proportional action and reset action so that the system will maintain a constant output frequency rather than adjusting itself to a new frequency which balances the error and the variation in the actuator.

The transducer control system and general alternator control described and claimed is a system which is readily adapted to control an individual alternator of a group of alternators which are connected in parallel to supply electrical power to a common bus and therefore to a load. The problems which that system obviates are described in the copending application and when a group of parallel alternators are each provided with the control system described, load division between the alternators results. Load division between a group of parallel alternators, however, frequently must be maintained within close tolerances of a preferred range of about ten percent, plus or minus, of the average load. Although the system described and claimed in the copending application is an accurate and efficient one for accomplishing this end, I have provided, by the system of the present invention, a system for controlling and coordinating these alternator controls for a group of parallel alternators so as to positively insure proper load division between the alternators.

By the system of the present invention I have provided a system for interconnecting and coordinating the transducers described in detail in the copending application such that load division between the alternators is accurately maintained within the preselected limits about the average load. Also, by the system of the present invention I have provided for trim control of load division whereby alternator controls embodying the principles of the invention of the copending application are actuated still more accurately.

It is, therefore, an important object of the present invention to provide a load division control system for a plurality of alternators coupled and parallel to a bus supply for a common load.

Still another object of the present invention is to provide a system for interconnecting and coordinating alternator controls as described and claimed in the copending application above identified.

Another important object of the present invention is to provide an alternator load division control system with load trim characteristics whereby trim controlled load division between alternators is maintained within a preselected range of the average load accurately and efficiently.

Yet another object of the present invention is to provide coordinated load trim and division system for a plurality of alternators coupled and paralleled to a common bus supply including frequency and load responsive transducer control means for each of the alternators and interconnected load trim means in each of the transducer means to coordinate the operation of the transducer control means.

Yet another object of the present invention is to provide a load division and load trim system wherein there is provided a trim coil in the magnetic amplifier stage of each of the transducer control means for each of the alternators with the trim coils interconnected in parallel for coordinating the control provided by each of the transducers.

Still other objects, features and advantages of the present invention will become readily apparent from the following detail description of the present invention and a preferred embodiment thereof, from the appended claims, and from the accompanying drawings which form a part of this specification and fully and complete disclose each and every detail shown thereon as a part of the present specification, in which like reference numerals refer to like parts, and in which there is schematically illustrated a preferred system for controlling a plurality of paralleled alternators for proper load division and load trim in accordance with the principles of the present invention.

In the single figure of drawing there is illustrated a preferred embodiment of the present invention wherein alternators of the like $1^a$, $1^b$, $1^c$ and $1^d$ are driven by controlled driving units such as pneumatic turbines or other fluid driven turbines or other desired transducer controllable driving medius $2^a$, $2^b$, $2^c$ and $2^d$ preferably through gear boxes or the like $3^a$, $3^b$, $3^c$ and $3^d$. The output of the gear boxes being coupled directly to the alternators is also drivingly coupled to tacho generators or the like $4^a$, $4^b$, $4^c$ and $4^d$, respectively, for providing an output signal of a frequency identical with or proportional to the frequency of the output of the alternators, respectively.

The signals from the tacho generators or the like $4^a$, $4^b$, $4^c$ and $4^d$ are fed to frequency error and speed error sensing units or the like such as frequency discriminators $5^a$, $5^b$, $5^c$ and $5^d$, respectively.

The frequency error signal provided at the output of the frequency discriminators or the like $5^a$, $5^b$, $5^c$ and $5^d$ is fed to a magnetic amplifier stage $6^a$, $6^b$, $6^c$ and $6^d$ of each of the control transducers $7^a$, $7^b$, $7^c$ and $7^d$, respectively. The transducers actuated by the control signals on the magnetic amplifiers operate through a mechanical coupling indicated generally by the broken dashed lines $8^a$, $8^b$, $8^c$ and $8^d$ operatively control the driving energy available to the drive units $2^a$, $2^b$, $2^c$ and $2^d$, respectively.

Load sensing units or networks $11^a$, $11^b$, $11^c$ and $11^d$ sense the real loads on the alternators $1^a$, $1^b$, $1^c$ and $1^d$ individually and respectively consumed in the load 12 and supplied thereto by the individual alternator lines $13^a$, $13^b$, $13^c$ and $13^d$ connected in parallel to the common bus line 15. The load sensing networks $11^a$, $11^b$, $11^c$ and $11^d$ are tied respectively to one of the lines of each of the alternators by potential leads and current transformers indicated generally at $14^a$, $14^b$, $14^c$ and $14^d$, respectively. The output from the load sensing networks is fed to a mixing stage or the like $16^a$, $16^b$, $16^c$ and $16^d$ intermediately between the frequency discriminators and the magnetic amplifier stages of the transducers to which they are coupled respectively. This signal is supplied across a resistor or the like $17^a$, $17^b$, $17^c$ and $17^d$ in each of the mixing stages respectively. The combined signals of the load sensing units and the frequency sensing units are impressed on first control coils $18^a$, $18^b$, $18^c$ and $18^d$, respectively, of the magnetic amplifier stages $6^a$, $6^b$, $6^c$ and $6^d$, respectively, thereby controlling the operation of the transducers $7^a$, $7^b$, $7^c$ and $7^d$ to control the operating power and speed of the alternators $1^a$, $1^b$, $1^c$ and $1^d$ in accordance with the principles described in the copending application above identified.

To review the operating characteristics of each of these systems, however, it is pointed out that deviations in the speed of the alternators is transmitted to the frequency discriminators by deviations in the speeds of the tacho generators or the like. These variations in speed produce an error signal from the frequency discriminators which has a sign in amplitude operable as a function of the variation in the frequency, considering both the direction of the variation and the magnitude of that variation. If, for example the alternator $1^a$ should be reduced in speed for some reason or other either due to an increased load thereon or a decreased power supply thereto from the driving unit, the frequency discriminator will be of such sign and amplitude as to cause a current in the control winding $18^a$ of the magnetic amplifier $6^a$ actuating the transducer $7^a$ to increase the power and the speed available to the alternator 1 from the driving unit $2^a$ and gear box $3^a$. Of course, an increased speed due to increased power or decreased load at the alternator $1^a$ will cause an opposite signal and an opposite ultimate effect thus restoring the alternator $1^a$ to its proper operating speed and no load frequency.

Also as explained in detail in the copending application, above identified, the load sensing units or networks are so arranged and coupled into each of the mixing stages that when provided with a signal of increasing load they have an output which is operable upon the transducer to effect a decrease in the speed of the alternators to which they are tied in an effort to decrease the load output available from the alternator thereby permitting the alternator to take no more than its fair share of load. When a number of systems are individually connected to alternators tied in parallel, these load sensing networks tend to make the alternators carry only balanced proportions of the load if they are identical then each to take only a load substantially equal to the average load. Since the signal output of the load sensing networks $11^a$, $11^b$, $11^c$ and $11^d$ is thus in first to the output signal of the frequency discriminators or the like $5^a$, $5^b$, $5^c$ and $5^d$, the load sensing networks are also preferably provided with time delay or lag networks and stages operable to delay the load sensing signal to the transducers by a period developed by the period of the inertia of the mechanical portions of the system and the time delay present in the magnetic amplifier stages.

In accordance with the principles of the present invention, however, to insure proper load division and to make the system even more accurate with regard to load trim characteristics, each of the magnetic amplifiers $6^a$, $6^b$, $6^c$ and $6^d$ is provided with an another control coil $20^a$, $20^b$, $20^c$ and $20^d$, respectively. Each of these supplementary control coils in the magnetic amplifier stages of the transducers operates as a load division trim coil effective to coordinate the transducers $7^a$, $7^b$, $7^c$ and $7^d$ thereby to coordinate the alternators $1^a$, $1^b$, $1^c$ and $1^d$ so that each has an output closely limited to the average load within a range of about ten percent plus or minus with respect to the average load. It is to be noted that this is an extremely close tolerance of load division in that most heretofore known systems were operable principally within the range of about twenty percent, plus or minus, to thirty percent, plus or minus, with respect to the average load. Systems embodying the principles of the present invention are, therefore, representative of an important improvement over the heretofore known systems.

These trim coils $20^a$, $20^b$, $20^c$ and $20^d$ are each connected in series with a limiting element such as a resistor or the like $21^a$, $21^b$, $21^c$ and $21^d$ which are effective not only as limiting elements but also as signal smoothing elements. The signal on each of the trim control coils in the magnetic amplifiers is provided from the output of each of the load sensing networks $11^a$, $11^b$, $11^c$ and $11^d$, respectively, so that each of these coils has a portion of its signal representative of the load on the alternator to which the transducer carrying the coil is connected directly. The trim coils are not however confined to operative characteristics in the single transducer which contains the same, but they are connected in parallel through the load sensing networks from which they derive a major portion of their signals. Thus, from tops of limiting and smoothing elements $21^a$, $21^b$, $21^c$ and $21^d$ they are electrically tied together as by a line 22. At the bottom end of each of the control trim coils each is tied to one side of its respective load sensing as by lines $23^a$, $23^b$, $23^c$ and $23^d$. From the opposite side of each of the load sensing networks, the several systems are also tied together as by the parallel connecting line 24.

Thus, and as illustrated, the several trim coils in the magnetic amplifier stages are connected in parallel through the load sensing networks and smoothing elements. This interconnection and intercoupling between the several trim coils serves to interconnect and intercouple each of the control systems and the transducers thereof in such a manner that positive accurate load division between the several alternators is continuously maintained by the load trim network. Any unbalance between the several transducers or between the several alternators as sensed by the load sensing networks will appear in positive or negative currents, depending upon the direction of the unbalance and error, such that currents will flow in the trim coils $20^a$, $20^b$, $20^c$ and $20^d$ to vary the driving speed and driving load of each of the alternators through the control of the transducers to balance the systems into substantially precise load division.

As an example, assuming that the alternator $1^a$ is supplying more than the average load for the output, the load sensing network will produce a signal impressed upon the trim coil $20^a$ tending to reduce the speed of the alternator 1 and the power available thereto and in addition will cause a signal to be impressed upon the other trim coils 20ᵇ, 20ᶜ and 20ᵈ effective to cause a signal to be supplied into the transducers 7ᵇ, 7ᶜ and 7ᵈ resulting in an increased power and increased speed for the alternators 1ᵇ, 1ᶜ and 1ᵈ thereby bringing the system into a balance and insisting upon proper load division between the several alternators 1ᵃ, 1ᵇ, 1ᶜ and 1ᵈ. Thus, varying characters of errors and unbalances existing between the several alternators will be corrected by this interconnected and inter-coupled load division and load trim system.

It will be understood, of course, that numerous variations and modifications may be effected without departing from the true spirit, and scope of the novel features and concepts of the present invention. I, therefore, intend by the appended claims to cover all such modifications and variations as fall within the spirit and scope of my invention.

I claim as my invention:

1. In a load division control system for a plurality of alternators coupled to a common load, transducer control means for controlling the application of drive torque to each alternator, load sensing means for developing a signal proportional to the load on each alternator, speed sensing means for developing a signal varying with variations in the speed of each alternator, means for combining the outputs of the speed and load sensing means for each alternator and applying a composite signal to said transducer control means to obtain a drooping speed-load characteristic for each alternator, means for comparing the output signals from said load sensing means to develop supplementary control signals, and means for applying said supplementary control signals to said transducer control means to adjust for variations in the relative loads of said alternators while maintaining a drooping speed-load characteristic for the composite system.

2. In a load division control system for a plurality of alternators coupled to a common load, transducer control means for controlling the application of drive torque to each alternator, load sensing means for developing a signal proportional to the load on each alternator, speed sensing means for developing a signal varying with variations in the speed of each alternator, means for combining the outputs of the speed and load sensing means for each alternator and applying a composite signal to said transducer control means to obtain a drooping speed-load characteristic for each alternator, supplemental control means in each of said transducer means, a series load trim control circuit for each alternator including said load sensing means and said supplemental control means, and means connecting said series load trim control circuits in parallel to adjust for variations in the relative loads of said alternators while maintaining a drooping speed-load characteristic for the composite system.

3. In a load division control system for a plurality of alternators coupled to a common load, transducer control means for controlling the application of drive torque to each alternator and including amplifier means having a plurality of inputs, load sensing means for developing a signal proportional to the load on each alternator, speed sensing means for developing a signal varying with variations in the speed of each alternator, means for combining the outputs of the speed and load sensing means for each alternator and applying a composite signal to one input of said amplifier means to obtain a drooping speed-load characteristic for each alternator, means for comparing the output signals from said load sensing means to develop supplementary control signals, and means for applying said supplementary control signals to separate inputs of said amplifier means to adjust for variations in the relative loads of said alternators while maintaining a drooping speed-load characteristic for the composite system.

References Cited in the file of this patent

UNITED STATES PATENTS

| 2,590,023 | Lewis et al. | Mar. 18, 1952 |

FOREIGN PATENTS

| 438,364 | Great Britain | Nov. 12, 1935 |